United States Patent
Birrittella

(10) Patent No.: US 6,266,759 B1
(45) Date of Patent: Jul. 24, 2001

(54) REGISTER SCOREBOARDING TO SUPPORT OVERLAPPED EXECUTION OF VECTOR MEMORY REFERENCE INSTRUCTIONS IN A VECTOR PROCESSOR

(75) Inventor: Mark S. Birrittella, Chippewa Falls, WI (US)

(73) Assignee: Cray, Inc., Seattle, WA (US)

( * ) Notice: Subject to any disclaimer, the term of this patent is extended or adjusted under 35 U.S.C. 154(b) by 0 days.

(21) Appl. No.: 09/211,118

(22) Filed: Dec. 14, 1998

(51) Int. Cl.[7] .................................................... G06F 15/00
(52) U.S. Cl. ................................. 712/5; 712/217
(58) Field of Search ................................. 712/3, 4, 5, 6, 712/7, 208, 216, 200, 215, 209, 218, 217; 711/207, 208, 128, 209

(56) References Cited

U.S. PATENT DOCUMENTS

| | | | | |
|---|---|---|---|---|
| 4,903,196 | * | 2/1990 | Pomerene et al. | 712/217 |
| 5,063,497 | * | 11/1991 | Culter et al. | 712/6 |
| 5,319,791 | * | 6/1994 | Williams et al. | 712/3 |
| 5,745,721 | * | 4/1998 | Beard et al. | 712/208 |
| 5,895,501 | * | 4/1999 | Smith | 711/207 |
| 6,012,135 | * | 1/2000 | Leedom et al. | 711/200 |
| 6,055,625 | * | 4/2000 | Nakada et al. | 712/216 |

* cited by examiner

Primary Examiner—Richard L. Ellis
(74) Attorney, Agent, or Firm—Schwegman, Landberg, Woessner & Kluth, P.A.

(57) ABSTRACT

A vector-processor SIMD RISC computer system uses virtual addressing and overlapped instruction execution. Indicators for each of the architected registers assume different states when an instruction, overlapped with a vector memory-reference instruction, has or has not read from or written to a particular register. Multiple overlapped vector memory-reference instructions are assigned separate sets of indicators. Indicators in a certain state prevents a subsequent overlapped instruction from writing to its associated register.

30 Claims, 3 Drawing Sheets

REGISTER SCOREBOARDING TO SUPPORT OVERLAPPED EXECUTION OF VECTOR MEMORY REFERENCE INSTRUCTIONS IN A VECTOR PROCESSOR

BACKGROUND OF THE INVENTION

The present invention involves electronic data processing, and more specifically concerns apparatus and methods for enabling a vector processor to employ virtual addressing while overlapping the execution of multiple instructions in a single instruction stream.

Many very high performance supercomputers employ vector processing, sometimes called SIMD (single instruction, multiple data) architecture. Vector processing processes data having many elements in parallel with a small instruction overhead. It is particularly advantageous in a RISC (reduced instruction set computer) environment, because multiple copies of the RISC general-purpose registers, sometimes called architectural or architected registers, are easily integrated into a chip.

On the other hand, vector-processing systems have heretofore been confined essentially to the use of real addresses for operands. Almost every other processor now employs virtual addressing, in which a virtual address in a program is translated at run time into a different real address for accessing memory. Translation occurs on the fly, using a translation table in a high-speed lookaside buffer to store frequently used blocks of addresses, so that the translator rarely needs to access the actual translation table from main memory.

Although the virtual-address hit rate is high, the penalty for a page fault is much higher in a vector processor than it is in a scalar architecture. Although loading a new page is time-consuming, the occurrence of a page fault in a scalar processor can be detected a short time after commencing a load or store operation. Whether or not a vector load or store will produce a page fault, however, requires far more time. In a processor that operates on 64 vector elements simultaneously, a page fault can occur upon loading or storing any of the 64 elements, because the elements can reside in different memory pages. This would require a vector processor with virtual addressing to stop executing other instructions while 64 elements are processed for every memory-reference instruction. For this reason, the overhead of using virtual addressing in a vector-processing architecture cannot be countenanced. In a pure RISC system, all operations take place within a relatively small set (from 16 to 256 or more) of architectural general-purpose registers, except for a very small number of memory-reference instructions which do nothing more than load an operand from memory to a register or store a register's contents to memory.

Some processors overlap the execution of multiple instructions for higher speed. However, if any of the overlapped instructions is a memory-reference instruction, the machine must roll back all subsequent instructions if a page fault occurs during the loading or storing of any of the vector elements. It can do this by saving the machine state, including the contents of all registers, updating the lookaside buffer with the new page addresses, successfully reloading all the vector elements, and then redoing the subsequent instructions. However, if one of the speculatively executed overlapped instruction has changed the contents of a register needed for the reexecution of another of the rolled back instructions, that instruction cannot be redone properly. The straightforward solution is to prohibit overlapped instructions following any memory-reference instruction. However, overlapping would then produce little or no benefit.

SUMMARY OF THE INVENTION

The present invention significantly reduces the penalty of including virtual addressing in a computer system having a vector processor by allowing effective overlapped instruction execution during a vector memory-reference vector instruction. The invention ensures that overlapped instructions executed speculatively during one or more memory-reference instructions can be rolled back and reexecuted correctly if a page fault occurs.

The invention adds a matrix of flags or indicators to the architect registers for recording whether any overlapped instructions would modify the contents of any register that another of these instructions would require if it would have to be reexecuted. If it would, then that instruction is stalled or halted until the vector memory-reference instruction completes successfully. If the indicators do not preclude it, the other instruction may proceed. The indicator matrix has as many columns as the number of potentially overlapped vector memory-reference instructions. It has a separate row for each architectural register in the system. Each individual indicator cell has three states, depending upon whether the register has or has not sourced or targeted data for any other instruction during a currently executing memory-reference instruction. The states of certain indicators are queried to determine whether or not an overlapped instruction can proceed without destroying data required by another overlapped instruction that might have to be rolled back and reexecuted.

DESCRIPTION OF A PREFERRED EMBODIMENT

Figure 1:
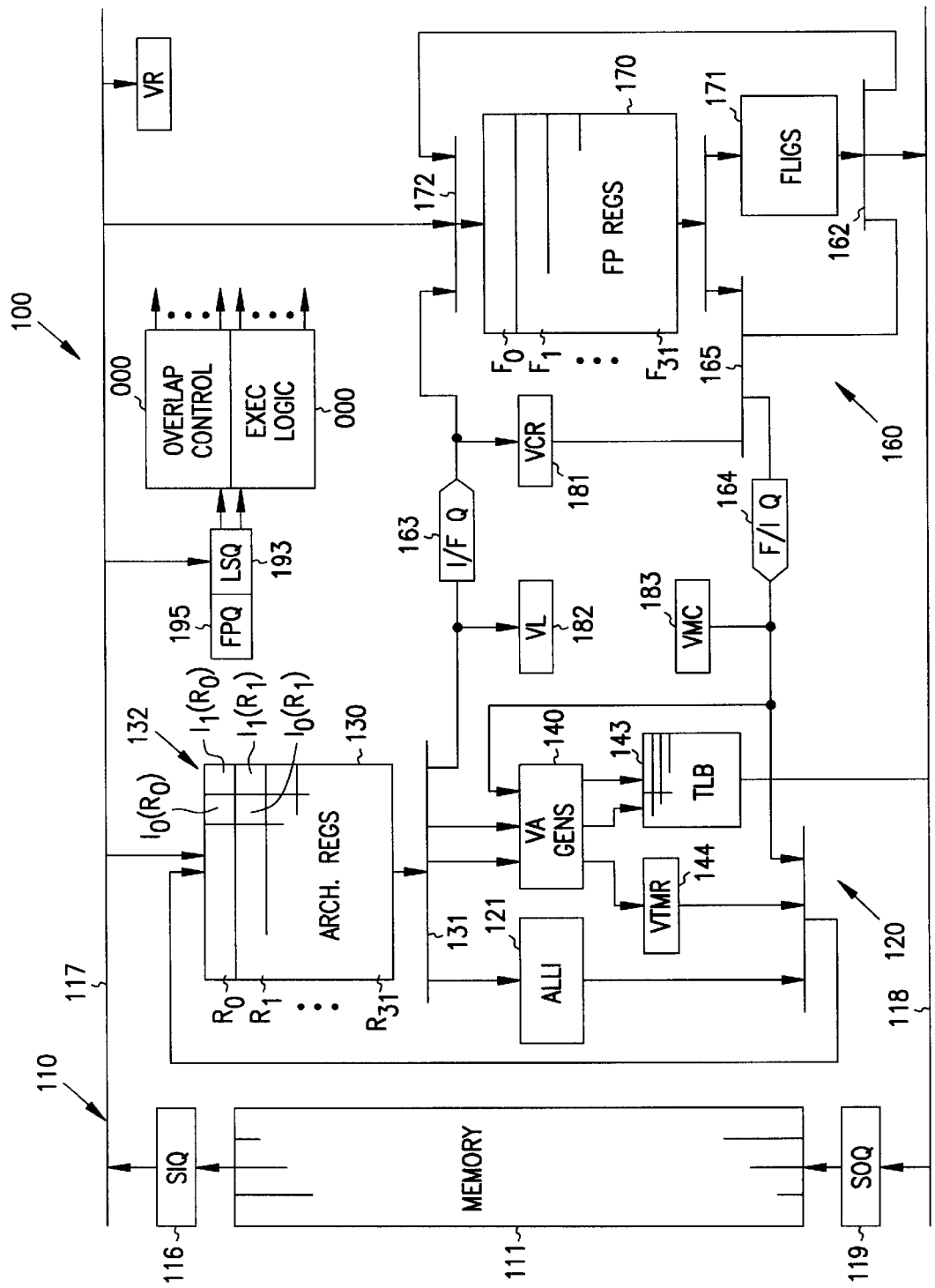
FIG. 1 is a high-level block diagram of a computer incorporating the invention.

FIG. 1 shows a portion of a high-performance RISC supercomputer 100 capable of performing operations upon an entire vector of operand elements simultaneously.

At a high level, computer 100 includes a memory subsystem 110, a vector processing unit 120 performing integer and floating-point operations upon vector operands, and a scalar processing unit 130 for performing integer and floating-point operations upon single-element operands. Some computers may combine units 120 and 130, or arrange them in a different manner. Control unit 140 clocks and interconnects the other units for executing a stream of instructions. Control unit 140 incorporates a conventional instruction cache 141. Conventional fetch logic 142 determines which instructions are to be executed and obtains them. Issue logic 143 sends conventional signals to the other units for timing and executing different parts of overlapped instructions concurrently. This overlap is in addition to the parallelism afforded by executing a single instruction upon multiple elements of a vector operand simultaneously. A conventional program counter 145 holds the addresses of the currently executing instructions. In a system of this type, the program counter keeps track of instructions being fetched, instructions currently being executed, and instructions that have been retired. Retired or graduated instructions have been completed, and cannot be rolled back.

Memory subsystem 110 stores instructions, scalar operands, and vector operands as series of words each having real or physical addresses in main memory 111. In an illustrative embodiment, the memory has four independent sections of RAM each having a double-word width, allowing many words to be read or written in a single clock cycle. This memory can be constructed in many different ways, and can also include secondary storage of such as disk and tape drives as well as semiconductor or other primary RAM. Instructions and scalar operands each occupy one word at a single address. Vectors occupy multiple words. Vector elements may be spaced from each other by a constant positive or negative amount ("stride"), or by arbitrary offsets from a base address ("scatter/gather"). A data cache 112 holds recently used memory words as in conventional practice.

Load/store unit 113 manages the transfer of all instructions and data between memory 111 and units 120-140, including the translation of virtual addresses to and from real addresses. Translation lookaside buffer (TLB) 114 contains a table of recently used corresponding real and virtual page addresses. When unit 113 requests a virtual address, the TLB finds the corresponding real memory address. The TLB produces a page fault when a requested virtual page address is not present in the TLB. In that event, unit 112 must access a translation table in memory and move the proper entry into the TLB. If the TLB is already full, a less recently used entry must be deleted. The functions of components 113 and 114 are conventional, although some of them have not been employed in existing vector processors.

Processing units 120 and 130 employ a RISC architecture. In a RISC system, almost all instructions process operand data in one or more of a large set of architectural registers (or in the instruction itself), and return a result to one of the registers. In a pure RISC architecture, the only exceptions involve two memory-reference instructions whose only function is to load data from memory into one of the architectural registers, and to store the contents of one register to memory.

Vector unit 120 processes up to 64 elements of vector operands simultaneously. It also calculates memory addresses for vector memory-reference instructions. A group of 32 general-purpose vector registers 121, numbered $V_0$-$V_{31}$ in FIG. 1, form one set of the architectural registers mentioned above. Each register holds up to 64 elements of a vector operand or 64 address offsets of vector elements. Numeric operands may be either integer or floating-point. That is, each vector register actually comprises 64 copies, each holding one vector element. Scalar unit 130 processes single-element quantities. A group of 128 general-purpose scalar registers 131, numbered $S_0$-$S_{127}$, form another set of architectural registers. Each scalar register holds a single operand element or a single address. Most instructions transfer one or more operands, either scalar or vector, from one or more source registers 121 and 131 to one of a number of conventional vector and scalar arithmetic-logic function units, shown as single blocks 122 and 132. These units can pass results back to a destination or target register in the set 121 and 131. These units can pass results back to a destination or target register in the set 121 and 131. Of course, any number of registers can be employed, and the vector registers can hold any number of elements.

The present invention adds a matrix of indicators 146 to issue logic 143. The matrix has as many columns j as the maximum number of vector memory-reference instructions whose execution can be overlapped, given the clock speed, hardware facilities, and other design constraints of the particular system 100. Each row i of the matrix represents a corresponding one of the 160 architectural general-purpose registers $V_0$-$V_{31}$ and $S_0$-$S_{127}$. Thus, for example, $Q_{V0,0}$ and $Q_{V0,1}$ both pertain to register $V_0$, but represent two different overlapped instructions $I_0$ and $I_1$; $Q_{V0,0}$ and $Q_{V1,0}$ correspond to the same instruction $I_0$, but correspond to registers $V_0$ and $V_1$ respectively. A flag 147 for each column records which instruction $I_j$ is assigned to that column, or that the column is not assigned to any VMRI. Each indicator $Q_{ij}$ can hold a value representing one of three different states for register $V_i$ or $S_i$ with respect to instruction $I_j$. These states are called "unused," "live," and "dead." The terms introduced in this paragraph are purely metaphorical. The indicators, for example, need not be arranged in physical rows and columns in an integrated circuit, but merely need to be operatively associated with certain registers and instructions in some manner. Likewise, the particular names assigned to the states are merely for convenience of reference, and have no significance other than their usages described below.

Figure 2:
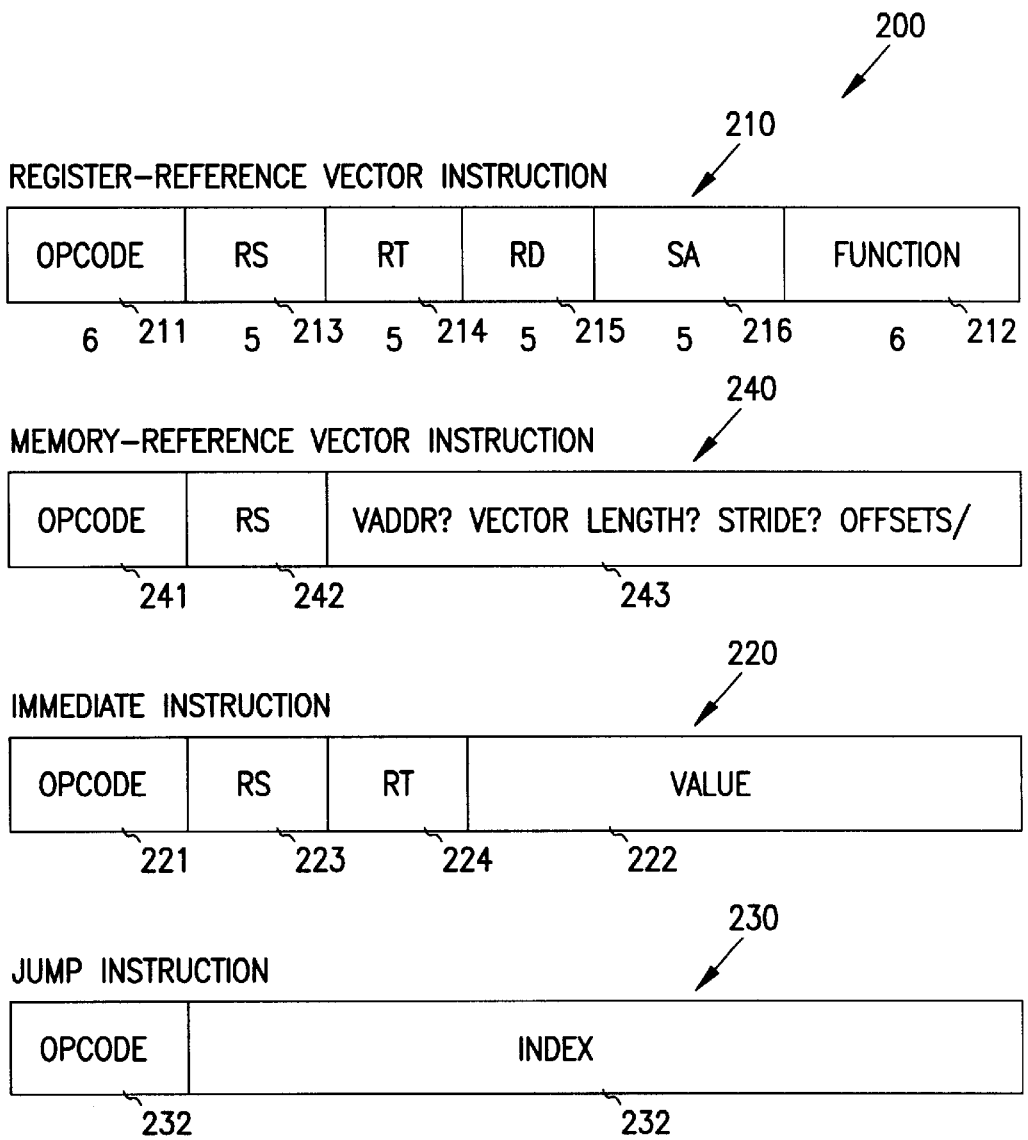
FIG. 2 is a schematic representative instruction formats for the computer of FIG. 1.

FIG. 2 shows the formats of several types of instructions 200 for system 100, FIG. 1. In a RISC system, almost all of the operations upon data involve passing the contents of one or more of a small number of architectural registers through an ALU such as 122 and 132. Any result data which may be produced in the ALU returns to another of the architectural registers, or to one of the architectural registers from which one of the original operands was taken. Instruction 210 shows the format for this class of register-to-register instruction. Operation code 211 specifies the operation to be performed; a function code 212 may specify further details of the operation. Fields 213-216 each specify one of the architectural registers 120 or 130 for various operands. Field 213 names a register holding a source operand. Field 214 names either a source register or a destination register, or further specifies an operation, depending upon the particular opcode in field 211. Field 215 always names a destination register. Field 216 specifies a five-bit quantity for shifting one of the operands. Although system 100 contains 256 architectural registers altogether, opcode 211 specifies whether the instruction is an integer operation or a floating-point operation, and thus whether fields 213-216 refer to the vector registers 120 or the scalar registers 130, FIG. 1.

Several other conventional types of instructions, augment the basic register-to-register format. Immediate instructions employ format 220. Opcode 221 may combine a 16-bit immediate value in field 222 with the contents of source register 223, and may store the result in destination register 224. Format 230 illustrates a program-counter instruction. Field 231 encodes the type of jump instruction, and field 232 specifies a jump target address.

Format 240 shows the memory-reference instructions. Opcode 241 designates the operation to be performed. Field 242 names one of the architectural registers as a source or destination, depending upon the opcode. Field 243 contains a virtual address to be translated into a real address in memory 111 or in data cache 112. The addresses of vector elements can be stored in many ways. For example, the first element of a vector is stored at a designated base address, with up to a certain maximum number of elements stored at a fixed address interval or stride from each other. In an approach called scatter-gather, elements after the first can be stored at arbitrary offsets from the first. The present invention is not limited to any particular technique for storing vector elements.

A pure RISC system admits only two memory-reference functions: load a memory location to a designated architectural register, and store the contents of an architectural register to a memory location. In this embodiment, four memory-reference instructions either load or store either a scalar or a 64-element vector. Some RISC systems—and all non-RISC systems—permit opcode 221 to specify other operations as well. In the present context, any instruction which references a memory location can be included in the group of memory-reference instructions. However, not all such instructions need be so included. For example, the motivation of the present invention is to avoid long delays while loading or storing multi-element vector operands against the possibility that a page fault or any element will invalidate the contents of an architectural register. An instruction that references a single-element scalar entails only a one-cycle delay should a page fault occur, and speculative instruction execution is not generally worthwhile. Therefore, the term "vector memory-reference instruction" (VMRI) for the present purpose refers to those instructions whose potential delay or time interval in translating memory addresses is long enough to make overlapped execution of other instructions desirable. In the present embodiment, all vector load and vector store instructions are VMRIs, while scalar load and store instructions are not.

Figure 3:
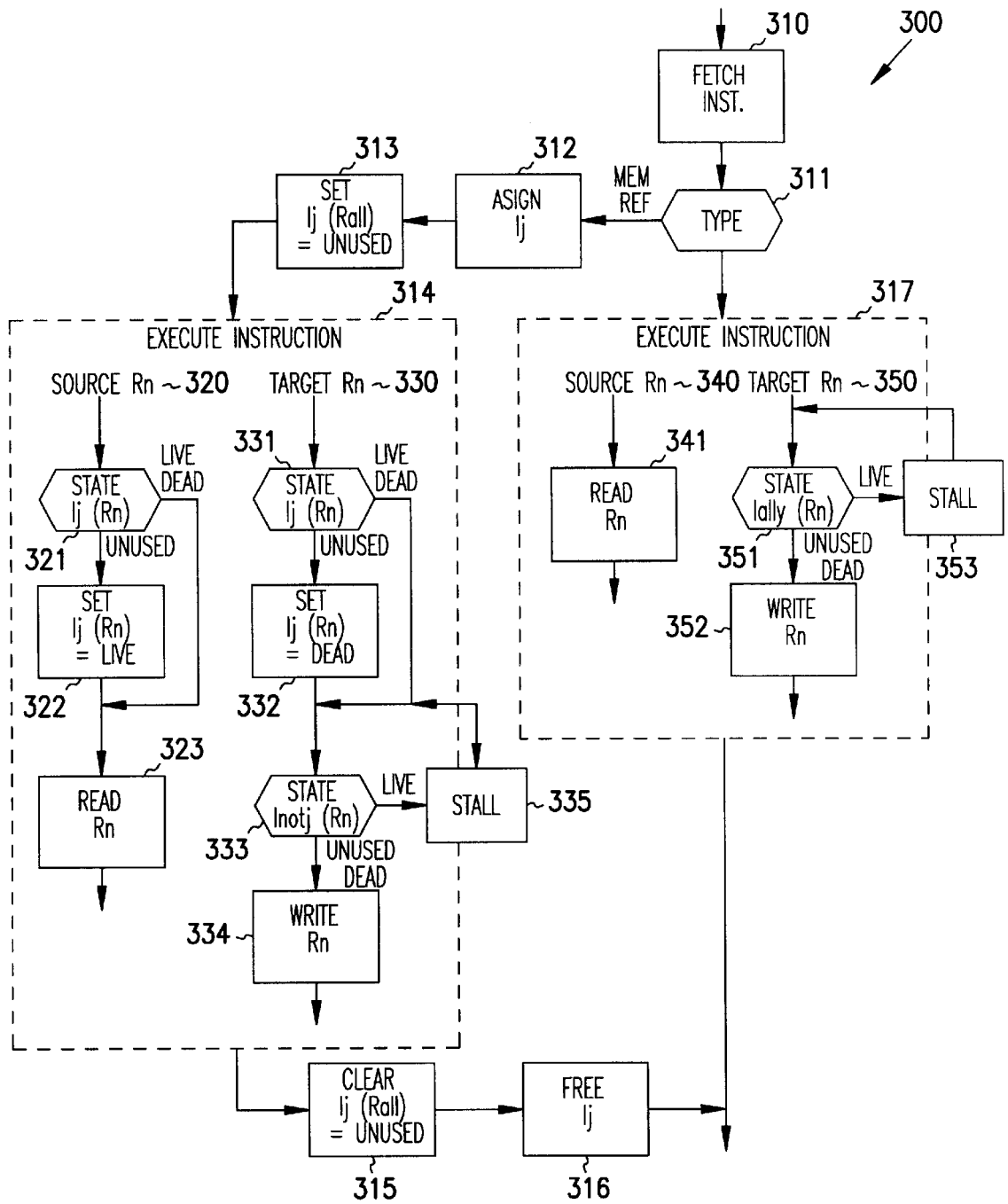
FIG. 3 is a flow diagram of issue logic for implementing the invention in the computer of FIG. 1.

FIG. 3 is a flowchart 300 for controlling the flow of instructions in a vector processor in a way that significantly reduces the overhead of employing virtual addressing in a vector processor having general-purpose registers. Block 310 fetches a new instruction under the control of logic 142, FIG. 1. If block 320 determines that the instruction is a VMRI, then block 321 assigns a column of indicators $I_j$ to that instruction. Block 330 executes the instruction. Block 330 is shown in multiple outline to indicate that the execution of many overlapped instructions can proceed at once. Line 331 signifies the ability of block 310 to call another instruction, VMRI or non-VMRI, during the execution of preceding instructions. Block 330 graduates or retires instructions as they complete execution.

The remainder of FIG. 3, blocks 340-360, operate asynchronously in issue logic 143, FIG. 1, as symbolized by lines 332 and 333.

Blocks 340 function whenever block 341 detects that one of the instructions currently executing in block 330 reads any of the general-purpose registers $V_i$ or $S_i$—that is, when an overlapped instruction sources data from a register whose contents must be saved if the instruction were to be rolled back and reexecuted. Block 342 interrogates the states of all indicators $Q_{i\{,\}j}$ for the register i being read, for all of the currently active VMRI instructions, denoted by $I_{\{j\}}$. If the state of any of these indicators is "unused," block 343 sets its state $Q_{ij}$ to "live." Block 344 reads the contents of the register as specified by the instruction. Control then returns via line 333 for other operations in performing the instruction in block 330.

Blocks 350 assume control over line 332 whenever block 351 detects that one of the overlapped instructions in block 330 requests to write to one of the general-purpose registers—that is, when the instruction targets data to a register whose state must be saved in a potential rollback. Block 352 determines the state of all indicators $Q_{i\{,\}j}$ for the target register for all of the current instructions. Block 353 sets any active $Q_{ij}$ to "dead" if its previous state was "unused." If block 354 detects that the indicators for that register for all of the instructions $I_{\{j\}}$ are either "unused" or "dead," then block 355 allows the register, $V_i$ or $S_i$, to be written. That is, in this case the register's contents can be modified without destroying any data needed for a possible future rollback. However, if any of the indicators in row i are in the "live" state, block 356 stalls all instructions currently executing in block 330, as symbolized by dashed arrow 357. Instruction execution in block 330 remains stalled until the states of all indicators $Q_{i,\{j\}}$ in that row exit the "live" state. In this implementation, a "live" state can be cleared only when arrow 363 indicates that its associated VMRI has completed, as described below.

Blocks 360 execute whenever block 361 detects that a VMRI clears TLB 114 and is retired. If the VMRI competes the translation of all vector-element addresses successfully, then block 362 resets all indicators $Q_{\{i\}j}$ in its $I_j$ column to the "unused" state. Arrow 363 symbolizes that any "live" indicator that might have caused a stall in block 356 frees that condition asynchronously. Block 364 frees the $I_j$ column for use by subsequent VMRI instruction. Had block 361 detected a page fault, however, block 365 initiates a conventional rollback operation, saving the contents of general-purpose registers and other processor information so that the processor can clear the fault and reexecute all of the rolled-back instructions that had partially executed before the fault had occurred. A fault does complete the execution of a VMRI; it must also be reexecuted after other operations in the processor reload TLB 114, FIG. 1. Therefore, even completion with a fault causes block 362 to terminate the stall in block 356. Rollback operation 365 has by this time removed the need for a stall or hold on execution. The "completion" of a VMRI in blocks 360 for the present purposes means that the VMRI is no longer able to initiate a rollback, either because it already has initiated one via the "fault" exit of block 361, or because the system has detected that all addresses have been (or will be) successfully translated, via the "yes" exit.

To summarize, the three indicator states for each register row of each instruction column signify the following:

"Unused" means that the register has been neither read nor written since the issuance of the VMRI with which it is associated, so that it can be used by an overlapped instruction.

"Dead" means that the register has been used, but writing new data would not destroy a necessary state.

"Live" means that writing new data to the register would destroy data needed by at least one other overlapped instruction, and would thus destroy a necessary state of the system should a VMRI produce a page fault and the overlapped instructions have to be rolled back and reexecuted.

Issuing a new VMRI places all rows in the column of its indicators into the "unused" state. When an instruction writes to a target register, its row of the instruction's indicator column changes to "dead." When an instruction reads from a source register, the indicator in the row associated with that register and in the column associated with the current instruction changes to "live". When any overlapped instruction attempts to write to a target whose state is "live" for any of the overlapped VMRIs, the instruction stalls until all of the VMRIs that had marked the register with that state complete execution. Once an instruction marks a register as "live" or "dead", nothing can alter that state until its VMRI releases the indicator. In this implementation, release from "live" and "dead" states occurs only when the VMRI completes execution, either successfully or with a page fault.

The above description, in conjunction with the drawing, permits one skilled in the art to make and use it. Modifications to the described embodiment within the scope of the invention, as well as advantages not specifically stated, will occur to those skilled in the art. I claim as my invention:

1. A method of overlapping the execution of multiple instructions in a virtual-address vector computer having architectural registers holding multiple vector elements, and a control unit for reading and writing said vector elements in said registers in accordance with a sequence of instructions, the method comprising:

executing a plurality of the instructions overlapped in time with each other, at least one of the instructions being a vector memory reference instruction (VMRI);

repeating the following operations for each of the overlapped instructions;

If the instruction is a VMRI, assigning a column of indicators to the VMRI, the indicators in the column corresponding to respective ones of the registers and setting all of the indicators in the column to an "unused" state;

identifying one of the registers as a source register for the overlapped instructions;

if the indicator corresponding to the source register is in the "unused" state, setting said indicator corresponding to the source register to a "live" state;

identifying one of the registers as a target register for the overlapped instruction;

if the indicator corresponding to the target register is in the "unused" state, setting said indicator corresponding to the target register to a "dead" state;

if the indicator corresponding to the target register is in the "live" state, stalling the overlapped instructions.

2. The method of claim 1, further comprising:
detecting completion of the VMRI;
setting the indicators in the column to the "unused" state.

3. The method of claim 2, wherein the completion of the VMRI is a successful completion.

4. The method of claim 3, further comprising freeing the column for use by a subsequent VMRI in the sequence of instructions.

5. The method of claim 2, wherein the completion of the VMRI denotes a page fault.

6. The method of claim 5, further comprising rolling back the overlapped instructions.

7. The method of claim 1, further comprising reading the contents of the source register.

8. The method of claim 1, further comprising writing to the target register if the indicator corresponding to the target register is not in the "live" state.

9. A method of overlapping the execution of multiple instructions in a virtual-address vector computer having architectural registers holding multiple vector elements, and a control unit for reading and writing said vector elements in said registers in accordance with a sequence of instructions, the method comprising:

executing a plurality of the instructions overlapped in time with each other, a plurality of the overlapped instructions being vector memory reference instructions (VMRIs);

repeating, for each of the overlapped instructions, identifying one of the registers as a source register for overlapped instruction;

if any of the indicators in the row corresponding to the source register is in the "unused" state, setting the indicator in the row corresponding to the source register and in the column corresponding to a current one of the instructions to a "live" state;

identifying one of the registers as a target register for the overlapped instruction;

if any of the indicators in the row corresponding to the target register is in the "unused" state, setting the indicator in the row corresponding to the target register and in the column corresponding to the current one of the instructions to a "dead" state;

if any of the indicators corresponding to the target register in the "live" state, stalling the overlapped instructions.

10. The method of claim 9, further comprising identifying those of the columns assigned to any of the VMRIs.

11. The method of claim 10, wherein the overlapped instructions are stalled only if the indicators in the "live" state are located in any of the identical columns.

12. The method of claim 10, further comprising reading the contents of the source register.

13. The method of claim 10, further comprising writing to the target register if none of the indicators in the row corresponding to the target register and in any of the identified columns is in the "live" state.

14. The method of claim 9, further comprising:
detecting completion of one of the VMRIs;
setting the indicators in the column assigned to the completed VMRI to the "unused" state.

15. The method of claim 14, further comprising freeing the column assigned to the completed VMRI.

16. The method of claim 15, further comprising reassigning the freed column to another of the plurality of VMRIs.

17. The method of claim 14, further comprising rolling back the overlapped instructions.

18. A vector computer for executing overlapped instructions including vector memory-reference instructions (VMRIs) containing virtual addresses representing multi-element vectors, the computer comprising:

a memory subsystem for translating the virtual addresses to and from real addresses in response to the VMRIs;

a set of architectural registers coupled to the memory subsystem;

a matrix of indicators in a plurality of rows each corresponding to one of said registers and in at least one column associated with one of the VMRIs, each of the indicators being capable of assuming any of at least three different states, including an "unused" state indicating that its corresponding register has been neither written nor read during execution of one of the overlapped instructions, a "dead" state indicating that its corresponding register has been written during execution of one of the overlapped instructions, a "live" state indicating that its corresponding register has been read during execution of one of the overlapped instructions;

a control unit coupled to said registers and to said memory unit for reading and writing particular ones of the registers in response to the overlapped instructions, and for stalling executing of the overlapped instructions when both one of the overlapped instructions requests writing one of the registers, and one of the indicators associated with said one register is in the "live" state.

19. The computer of claim 18 wherein the matrix of indicators includes a plurality of columns, and wherein the control unit includes issue logic for assigning different ones of the columns to different ones of the VMRIs.

20. The computer of claim 19, wherein the number of columns in the matrix is determined by the number of VMRIs capable of overlapping each other.

21. The computer of claim 19, wherein the control unit includes issue logic for clearing the indicators of one of the columns in response to the completion of one of the VMRIs.

22. The computer of claim 19, wherein the control unit includes issue logic for freeing the indicators of one of the columns in response to the completion of one of the VMRIs.

23. The computer of claim 18, wherein the memory subsystem comprises:
   a memory unit for storing data at the real addresses; and
   a load/store unit for translating between the real addresses and the virtual addresses.

24. The computer of claim 23, wherein the data includes elements of multi-element vectors.

25. The computer of claim 23 wherein the memory subsystem further comprises a translation buffer coupled between said memory unit and said load/store unit.

26. The computer of claim 23, further comprising a vector processing unit having a vector function unit coupled to the registers.

27. The computer of claim 26, further comprising a scalar processing unit coupled to said vector processing unit and to said load/store unit.

28. A vector computer for executing overlapped instructions including vector memory-reference instructions (VMRIs) containing virtual addresses representing multi-element vectors, the computer comprising:
   memory means for translating the virtual addresses to and from real addresses in response to the VMRIs;
   a set of register means coupled to the memory means;
   a matrix of indicator means in a plurality of rows each corresponding to one of said register means and in a plurality of columns each associated with a different one of the VMRIs, each of the indicator means being capable of assuming any of at least three different states, including
      an "unused" state indicating that its corresponding register means has been neither written nor read during execution of one of the overlapped instructions,
      a "dead" state indicating that its corresponding register means has been written during execution of one of the overlapped instructions,
      a "live" state indicating that its corresponding register means has been read during execution of one of the overlapped instructions;
   control means coupled to said register means and to said memory means for reading and writing particular ones of the register means in response to the overlapped instructions, and for stalling executing of the overlapped instructions when both
      one of the overlapped instructions requests writing one of the register means, and
      one of the indicator means associated with said one register means is in the "live" state.

29. The computer of claim 28, wherein the control unit includes issue logic for clearing the indicators of one of the columns in response to the completion of its associated VMRI.

30. The computer of claim 29, wherein the completion of the associated VMRI occurs in response to a page fault in translating the virtual addresses to or from the real addresses.

* * * * *

UNITED STATES PATENT AND TRADEMARK OFFICE
CERTIFICATE OF CORRECTION

PATENT NO. : 6,266,759 B1
DATED : July 24, 2001
INVENTOR(S) : Birrittella et al.

It is certified that error appears in the above-identified patent and that said Letters Patent is hereby corrected as shown below:

Column 2,
Line 38, delete "schematic representative" and insert -- schematic of representative --, therefor.

Column 8, claim 9,
Line 8, delete "register" and insert -- register is --, therefor.

Signed and Sealed this

Twenty-sixth Day of February, 2002

Attest:

Attesting Officer

JAMES E. ROGAN
Director of the United States Patent and Trademark Office